United States Patent [19]
Bettinger et al.

[11] 3,819,914
[45] June 25, 1974

[54] DEVICE FOR THE FLIGHT GUIDANCE FROM A WIRELESS GUIDE BEAM

[75] Inventors: Eugen Julius Bettinger, Friedrichshafen; Harmut Heiner Bohret, Uhldingen-Muhlhofen; Gunther Schanzer, Uberlingen/Bodensee, all of Germany

[73] Assignee: Bodenseewerk Geratetechnik GmbH, Uberlingen/Bodensee, Germany

[22] Filed: May 17, 1973

[21] Appl. No.: 361,146

[30] Foreign Application Priority Data
Oct. 12, 1972 Germany.......................... 2249979

[52] U.S. Cl........... 235/150.22, 244/77 A, 318/583, 343/112 C
[51] Int. Cl.............................................. G06g 7/78
[58] Field of Search.............. 235/150.22; 73/178 T; 244/77 A, 77 B, 77 C; 318/581, 583; 343/107, 108 R, 112 C, 112 D

[56] References Cited
UNITED STATES PATENTS
3,333,795  8/1967  Hattendorf et al. ....... 235/150.22 X
3,665,465  5/1972  Miller ....................... 235/150.22 X
3,666,929  5/1972  Menn............................ 235/150.22
3,743,221  7/1973  Lykken et al.............. 235/150.22 X

*Primary Examiner*—Charles E. Atkinson
*Assistant Examiner*—Jerry Smith
*Attorney, Agent, or Firm*—Darbo, Robertson & Vandenburgh

[57] ABSTRACT

The on-board landing approach apparatus of an aircraft includes a computer between the landing receiver and the autopilot and/or the crosspointer instrument employed to direct the landing approach and utilizing two output signals. The computer includes a first function generator for modifying the slant distance signal in a predetermined manner; a first multiplying means for multiplying the so modified slant distance signal and the azimuth angle deviation signal to produce a first output signal; a second function generator for modifying, in a predetermined manner, the difference of the slant distance signal and a distance characteristic of the particular airport being approached; and second multiplying means for multiplying said modified difference signal and an altitude angle deviation signal to produce the second output signal.

5 Claims, 16 Drawing Figures

Fig. 1

$\triangle S = \triangle \gamma_L R_a$

DEVICE FOR THE FLIGHT GUIDANCE FROM A WIRELESS GUIDE BEAM

BACKGROUND AND SUMMARY OF THE INVENTION

This invention relates to a device for directing the flight path along a localizer and glide path beam which supplies the aircraft position relative to a localizer and glide path transmitter according to elevation, azimuth and slant distance as signals on a localizer and glide path receiver mounted on the aircraft.

Some prior art approach and landing systems supply to the pilot azimuth, elevation and slant distance information relative to a localizer and glide path transmitter arranged on the runway. In a prior art method (TACAN) the localizer and glide path transmitter includes a central vertical dipole emitting pulse-shaped signals. A cylinder having a reflector arranged on a generatrix of it rotates about this dipole at 15 cycles per second. Thereby, the signal emitted by the dipole in each direction is modulated at 15 cycles per second, the phase position of the modulation, however, being dependent on the direction. This modulation has superimposed thereon another modulation at 135 cycles per second for the fine angle indication by means of another cylinder having nine reflectors and also rotating at 15 cycles per second. An additional reference pulse is emitted to indicate when the maximum of the radiation is, for instance, exactly in the eastern direction. From the phase difference of the 15 cycles-per-second basic modulation as compared with this reference pulse, an instrument in the aircraft can determine the azimuth angle of the aircraft.

A similar effect is achieved with another prior art system (SETAC) in which several dipoles are arranged a spaced distance from each other. One dipole transmits at a carrier frequency $f_o$; a second dipole spaced therefrom at a distance of a wavelength $\eta$ transmits at a frequency differing therefrom by 15 cycles per second, and a third dipole arranged at a distance $9\lambda$ transmits at $f_o + 135$ cycles per second. A similar effect is produced with a radiation pattern which rotates at 15 cycles per second and which has superimposed thereon the 135 cycles-per-second modulation so that a modulation of the field strength, dependent on the azimuth angle, is obtained at the location of the aircraft. However, a specific phase angle has associated therewith a spatial angle smaller, for instance, by a factor 10, so that the determination of the position becomes substantially more precise.

In the prior art system the elevation measurement is effected by utilizing the Doppler effect. An antenna system is provided having a plurality of dipoles arranged in superposed and parallel relationships. By an antenna commutator, a frequency $f_o + f_H$ is successively supplied to the different dipoles at a frequency $f_s$ so that a dipole is simulated which is moved from below upwardly at the frequency $f_s$ according to a sawtooth-shaped travel-to-time characteristic. By reflection of the emitted waves by ground, a corresponding radiator moved periodically downwardly is also observed in the aircraft. Then, in the aircraft a Doppler frequency shift $f_D$ proportional to the sine of the elevation angle is observed. Additionally, by the localizer beam transmitter the carrier frequency $f_o$ is emitted. The frequency spectrum observed in the aircraft then includes $f_o, f_o + f_H -$ $f_D$ and $f_o + f_H + f_D$. From this $f_D$ and the elevation angle are determinable.

According to a prior art method, the slant distance is determined from the pulse timing. The instrument arranged in the aircraft emits a pulse (interrogation pulse) which releases a sending pulse (answering pulse) on the associated instrument on ground. From the time difference between interrogation pulse and answering pulse the slant distance is determined.

An approach and landing system of the type indicated hereinbefore is, for instance, described in the article by Eckert and Roper "Das Anflug- und Landesystem SETAC" in the periodical "Luft- und Raumfahrttechnik" 16 (1970), No. 2, 43–48.

Generally, a localizer beam transmitter supplying azimuth and slant distance signals related to it, is arranged at the end of the runway, the azimuth angle 0 corresponding to the direction of the runway. A glide path transmitter supplying an altitude signal related to it, is located adjacent to the runway abreast of the ideal point of touchdown. In conventional systems, landing approach is effected along a straight flight path which may correspond to a constant elevation angle selected by the human pilot or preset (ILS) by the radio beam system. The deviations of the elevation angle from the selected command value and of the azimuth angle from the value 0, respectively, are indicated by a crosspointer instrument or flight director or are applied to an automatic flight control system. The former is an instrument having two systems moving two pointers crossed with respect to each other. The human pilot must direct the aircraft on such a flight path that the pointers constantly cross in the center of the instrument. In prior art approach and landing systems (ILS, SETAC, TACAN) the pointer deflection is proportional to the deviation of the elevation angle and of the azimuth angle, respectively.

Figure 5:
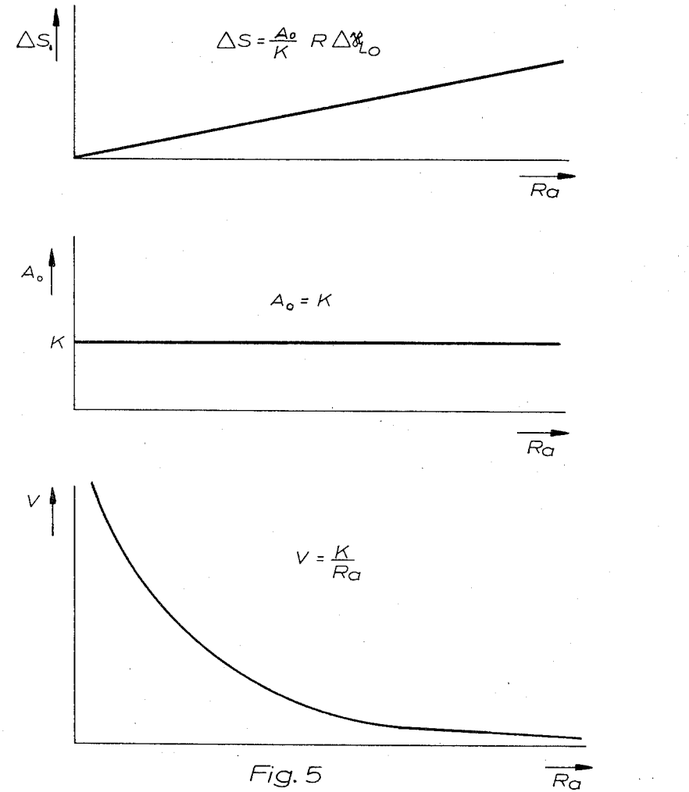
FIG. 5 are diagrams illustrating, in a conventional crosspointer indication, the travel deviation corresponding to the full deflection of the instrument, the pointer deflection corresponding to an angle deviation unit, as well as the gain of the indication related to the travel deviations as a function of the slant distance from the localizer and glide path transmitter.

In this connection an undesired effect occurs, namely, that the sensitivity of the indication relative to altitude and lateral deviations of the aircraft from the commanded radio beam increases with increasing approach to the localizer and glide path transmitter (FIG. 5). If the angle deviation corresponding to the full deflection of the instrument is selected too large, then for long distances from the localizer and glide path transmitter the flight path guidance is too inaccurate. If the angle deviation corresponding to the full deflection of the instrument is selected smaller, then a satisfactory path guidance is obtained when the aircraft is a relatively long distance from the localizer and glide path transmitter, yet, when approaching the localizer and glide path transmitter, the indication becomes increasingly more sensitive. Already for small altitude deviations of the aircraft which cannot be avoided even at medium gusts, the instrument is strongly deflected towards one or the other side. It has shown that with manual landing approach under instrument flight conditions at medium gusts an instability of the flight path guidance occurred at a slant distance of about 16,000 feet. At an elevation angle of 3° this corresponds to an altitude of the aircraft of 853 feet. Below this altitude, the human pilot is no longer in a position to fly the aircraft by the crosspointer instrument alone. Due to the instability, he must disengage from the radio beam and carry out the remaining critical part of the landing according to sight without the aid by the radio beam.

It has already been attempted to master these difficulties by a time-programmed stepwise change-over of the gain. However, in practice, such systems have not proven successful since with a preset time program the slant distance varies greatly at the instant of change-over, influenced by the most different factors.

It is an object of this invention to provide a device for directing the flight path along a localizer and glide path beam of the type mentioned in the beginning, which permits an unobjectionable flight path guidance on straight or curved approach profiles to the point of touchdown without instability, whether in the case of manual landing approach or in the case of an automatic flight path guidance. According to the invention this object is achieved by connecting the localizer and glide path receiver with an analog or digital computer by which the deviation signals corresponding to an angular deviation from a straight or curved approach profile are multiplied by the slant distance or a function thereof. By multiplying the angle deviation and the unmodified slant distance, the altitude deviation and the lateral travel deviation are respectively obtained, and that is independently of the slant distance from the localizer beam transmitter and the flight path flown. In this manner, the instrument for flight path guidance has the same sensitivity to travel deviations from the commanded flight path during the whole landing approach so that the aircraft can be maintained on the commanded flight path with constant accuracy and without the danger of instability. As will be described hereinafter, it may be desirable not to maintain the sensitivity of the instrument to travel deviations from the commanded flight path constant over the whole glide path, but to change it according to a desired function of the slant distance. This may be accomplished in that the deviation signals are multiplied by an appropriate function of the slant distance.

A device according to the invention for use with a radio beam transmitting arrangement in which a localizer beam transmitter supplies azimuth and slant distance signals related to it and a second transmitter positioned a preset spaced distance from the first one supplies an elevation signal related to it, can be designed such that the computer comprises a first and a second function generator, of which the first one has the slant distance signal applied thereto, and the second one has a signal applied thereto which signal is proportional to the difference of slant distance and said preset distance, that the output signal of the first function generator is supplied to a first multiplying element together with an azimuth angle deviation signal, and that the output signal of the second function generator is supplied to a second multiplying element together with an elevation angle deviation signal. The output signals of the two multiplying elements may be applied to the two systems of a crosspointer instrument. However, they may also be used for the automatic flight path guidance. In this conjunction, the assumption has been made, which is permissible for small altitude angles, that the distance of the aircraft from the second transmitter supplying the elevation signal, is equal to the difference of the slant distance signal from the first transmitter and of the distance between first and second transmitters.

The distance ($R_e$) from glide path and azimuth transmitters in mobile radio beam systems is automatically determined for synchronizing functions and is available in the receiver as signal. Since the azimuth transmitter generally radiates the slant distance (DME), the altitude slant distance can be determined by subtraction from DME and transmitter distance with an accuracy better than 1 percent for altitude angles up to 15°.

When guiding the aircraft in the azimuth it has shown to be expedient that the first function generator transmits the slant distance signal according to a function having a proportional rise in a range of small slant distances, a constant value in the range of medium slant distances, and another proportional rise in a range of great slant distances (threading into a given flight path). Then the sensitivity of the instrument to lateral travel deviations becomes constant in the range of small slant distances. In the range of medium slant distances, the function generator supplies a constant signal, i.e. the sensitivity of the indication of a lateral travel deviation is inversely proportional to the slant distance, or, expressed the other way around, the location of the lateral deviations corresponding to the full deflection of the instrument extends outwardly in funnel-shaped manner away from the localizer beam transmitter. For large slant distances a constant, however reduced, sensitivity to travel deviations in the azimuth is again obtained. The location of the travel deviations from the localizer beam corresponding to the full deflection of the instrument is formed by two parallel straight lines. In this manner, in the vicinity of the localizer beam transmitter, thus shortly prior to touchdown, a constant sensitivity to lateral travel deviations from the commanded flight path is obtained. In a medium range of slant distances the angle deviations are applied to the instrument similarly to the previously common approach. This procedure has proven successful for medium slant distances. For larger slant distances a reduced sensitivity to travel deviations again occurs.

This procedure permits the following simple intercept procedure when the aircraft approaches the radio beam on a course vertical or oblique to the beam. Then, if the cross-pointer instrument supplies a specific preset deflection for the azimuth deviation, the human pilot may, for instance, initiate a standard turn at 180°/min in order to exactly turn into the center of the localizer beam after a time dependent on the direction of approach. In contrast to the previous procedures this procedure is possible independently of the fact at what distance from the localizer beam transmitter the aircraft turns into the localizer beam.

For guiding the altitude of the aircraft it is advantageous that the second function generator transmits the difference signal according to a function having a linear rise in a range of small slant distance, a constant value in a range of medium slant distance, and a drop in the range of great slant distance.

For, with such a course of function of the function generator similar to the case of azimuth guidance, in the vicinity of the glide path transmitter a constant sensitivity to altitude deviations is obtained, while in a medium range steering is effected according to deviation angles. In contrast, however, to guidance in the azimuth, an overproportional decrease in the sensitivity to altitude deviations is obtained for altitude guidance. For altitude guidance, this facilitates "threading" the aircraft into the glide path beam. The lines of the altitude deviations corresponding to the full deflection of the instrument then have a "trumpet-shaped" form.

DESCRIPTION OF SPECIFIC EMBODIMENT

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements.

The FIGS. 1 to 4 illustrate the setup of the radio beam arrangement and the geometrical conditions. Reference numeral 10 designates a runway. The aircraft is intended to touch down on the runway at a point 12. At the far end of the runway is a localizer beam transmitter 14 supplying an azimuth and a slant distance signal. The azimuth angle is related to the center line 16 of the runway and will hereinafter be referenced $H$. A glide path transmitter 18 for measuring the altitude angle is positioned adjacent to the runway 10 abreast of th point of touchdown 12. The altitude angle will hereinafter be referenced $\gamma$. The distance of the glide path transmitter 18 from the localizer beam transmitter 14 is referenced $R_L$. The azimuth angle of the commanded localizer beam along which the aircraft should approach is referenced $H_L$. Normally, $H_L$ will be equal to 0, meaning that the aircraft should approach in the longitudinal direction of the runway. The slant distance from the localizer beam transmitter 14 to the aircraft is referenced $R_a$, this also being the distance measured by the distance measuring equipment (DME). The angle deviation is referenced $\Delta H_L$ and the associated travel lateral deviation is referenced $\Delta S$. Hence, the following equation applies $$\Delta S = \Delta H_L R_a$$

(1)

Figure 1:
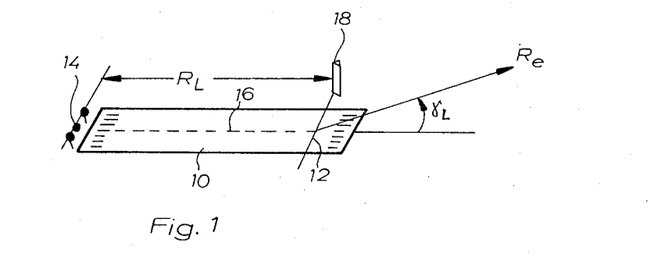
FIG. 1 is a perspective illustration showing a runway with a conventional radio beam arrangement including glide path transmitter, azimuth-localizer beam transmitter and distance measuring equipment (DME)
Figure 2:
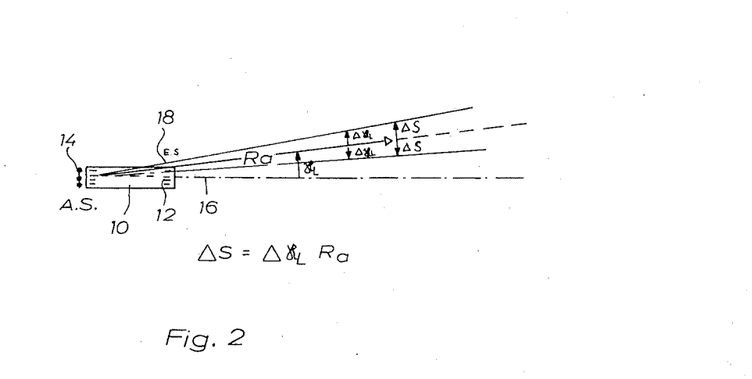
FIG. 2 is a plan view of the runway of FIG. 1 illustrating the geometry of the azimuth measurement.
Figure 3:
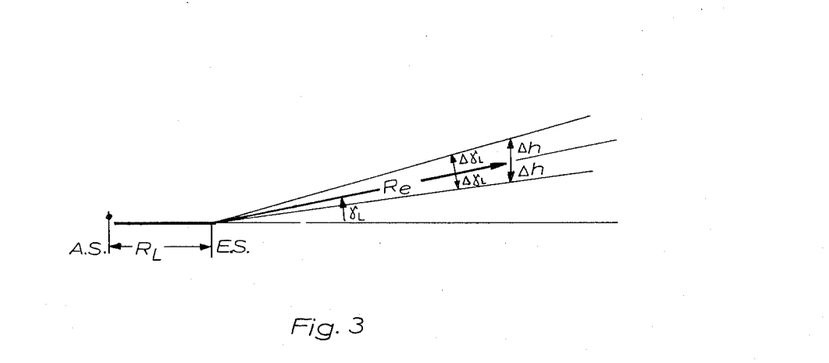
FIG. 3 is an elevational view of the runway illustrating the geometry of the elevation measurement.
Figure 4:
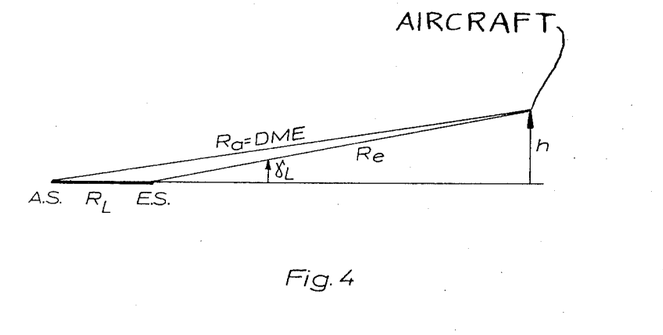
FIG. 4 is an elevational view of the runway illustrating the distance geometry.

The elevation angle of the commanded glide path beam along which the aircraft is to be guided, is referenced $\gamma_L$. This elevation angle has its vertex at the point of touchdown 12, i.e. at the glide path transmitter 18. If $R_e$ is the slant distance from the point of touchdown (i.e. the location of the glide path transmitter) and $\Delta\gamma_L$ the elevation angle deviation from the commanded glide path beam, as well as $\Delta h$ the altitude deviation from the commanded glide path beam, then $$\Delta\gamma_L = (h/R_e \cos \gamma_L)$$

(2)

For small path elevation angles $\cos \gamma_L$ may be assumed to be $\cos \gamma_L = 1$ with sufficient approximation. Under the same conditions we obtain $$R_e = R_a - R_L$$

(3)

wherein $R_a$ is determined by means of the distance measuring equipment (DME).

In prior art instruments for manual approach the angle deviations $\Delta H_L$ and $\Delta\gamma_L$ stated in equations (1) and (2) are indicated linearly on a crosspointer instrument. Such a crosspointer instrument has rectangularly crossing pointers which are deflected by systems in response to the azimuth and elevation angle deviations respectively. The human pilot must guide the aircraft in such a manner that the pointers constantly cross in the center of the instrument. In the prior art instruments there is the problem of suitably selecting the indicating sensitivities, i.e. determining which angle deviation corresponds to a full deflection of the crosspointer instrument. While a high sensitivity increases the accuracy of approach, it also, however, leads to instability of the flight path movements. For conventional ILS-approaches a constant indicating sensitivity in the azimuth of $A_S = \pm 2.5°$ angle deviation per crosspointer full deflection, and in the elevation of $A_H = \pm 0.5°$ angle deviation per crosspointer full deflection has shown to be a compromise between stability and accuracy.

The conditions occurring in this connection are illustrated in diagrams in FIG. 5.

The upper diagram in FIG. 5 shows the travel deviation $\Delta S_O$ from the beam causing a full deflection of the crosspointer instrument as a function of the slant distance. In the case of the azimuth angle deviation $\Delta H_L$ the distance $R_a$ corresponds to the distance from the localizer beam transmitter 14 (FIG. 1), while in the case of the elevation angle deviation $\Delta \gamma_L$ the distance from the glide path transmitter 18 is decisive. It shows that the travel deviation from the beam leading to a full deflection of the instrument becomes smaller, the closer the aircraft approaches the beam transmitter, thus the smaller becomes $R_a$ or $R_e$, respectively. The intermediate diagram shows the indicating sensitivity $A_o$ of the crosspointer instrument to deviation angle as a function of the slant distance $R_a$, which sensitivity is constant independently of the distance $R_a$. The lower diagram shows the indicating sensitivity V to deviation $\Delta S$, i.e. the deflection of the crosspointer instrument per unit travel deviation from the beam as a function of slant distance $R_a$. It shows that this indicating sensitivity V varies as a reciprocal of the travel deviation $\Delta S$ from the beam, thus very strngly increases with decreasing distance from the beam transmitter, of course, the instrument finally reaching the stop already in the case of small beam deviations. The letter K designates a constant.

Figure 6:
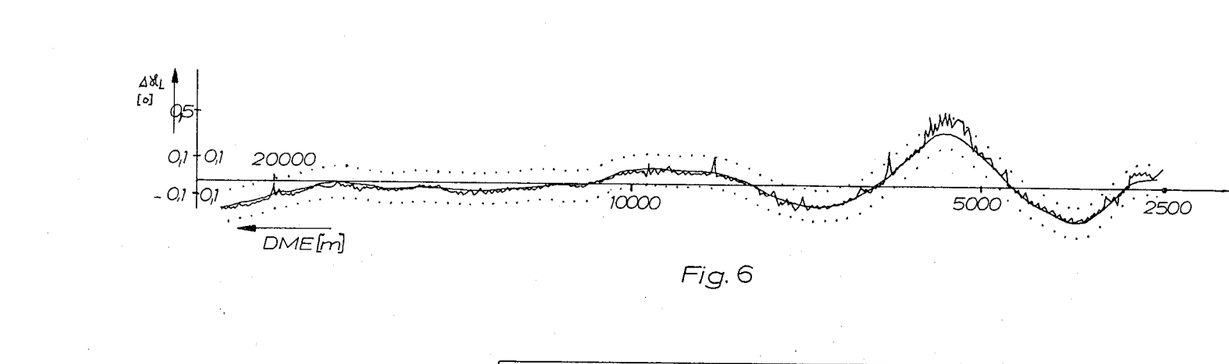
FIG. 6 illustrates the time course of the deviations from the localizer and glide path beam with a manual approach according to a crosspointer instrument having the angle deviation in a conventional manner applied thereto.

It has shown that with such a characteristic of the indication, a stable beam guidance during manual approach is possible only down to a specific minimum distance from the beam transmitter. For medium gusts, this distance is about 16,000 feet. FIG. 6 is a diagram elucidating the deviations from the beam during a manual approach to the beam transmitter. It shows that from a specific point the aircraft can no longer be maintained stably on the beam due to the sensitivity of the indication becoming too great.

Figure 7:
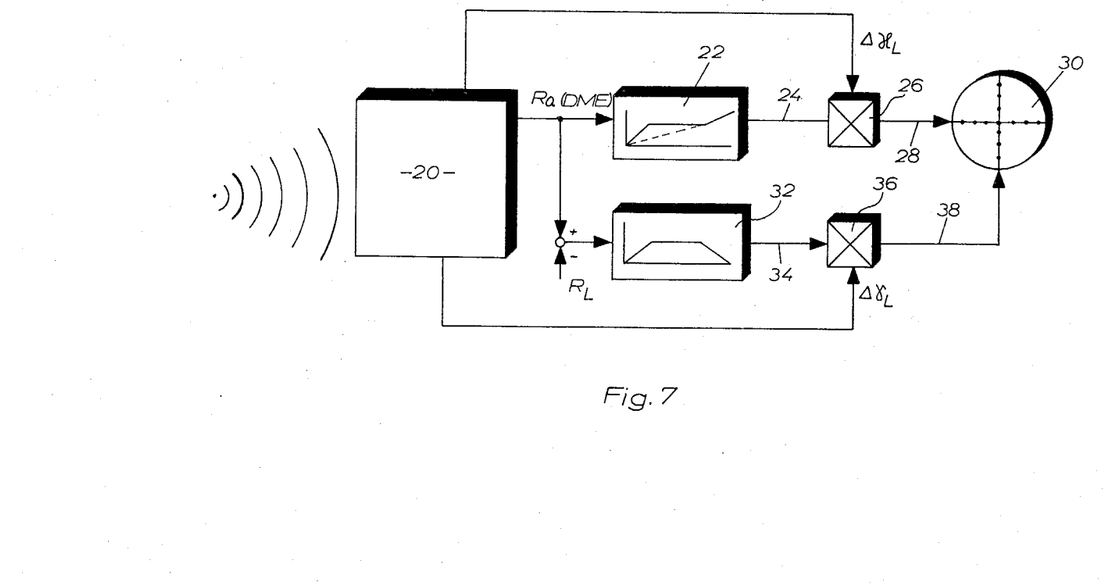
FIG. 7 is a block diagram of a device for directing the flight path according to the invention.

FIG. 7 illustrates an arragement according to the invention. There is a flight instrument 20 which supplies (in known manner, for instance from a SETAC-beam) the slant distance $R_a$ from the azimuth localizer beam transmitter 14, the azimuth angle deviation $\Delta H_L$, the elevation angle deviation $\Delta \gamma_L$ and the distance of the two transmitters $R_L$. In case of radio beam systems which do not supply an $R_L$ - signal, this known value for the respective airfield must be supplied manually by the human pilot. The $R_a$ - signal from the flight instrument or receiver 20 is applied to a first function generator 22 which supplies an output signal at an output 24 as a function of the indicated slant distance. This output signal at the output 24 is supplied together with the $\Delta H_L$ - signal from the flight instrument 20 to a multiplying element 26. The output 28 of the multiplying element 26 connects to one system of the crosspointer instrument 30. The difference $R_a - R_L$ which approximately corresponds to the slant distance $R_e$ from the glide path transmitter 18 is applied to a second function generator 32. At output 34 the function generator 32 supplies a signal as a function of the indicated difference signal. The output signal from the output 34 is supplied together with the $\Delta \gamma_L$ - signal from the flight instrument 20 to a multiplying element 36. The output 38 of the multiplying element 36 connects to the second system of the crosspointer instrument 30. Thus, the crosspointer instrument and automatic pilot 30 has signals applied thereto which signals are proportional to the angle deviation signals but are multiplied by a function of the slant distance.

Figure 8:
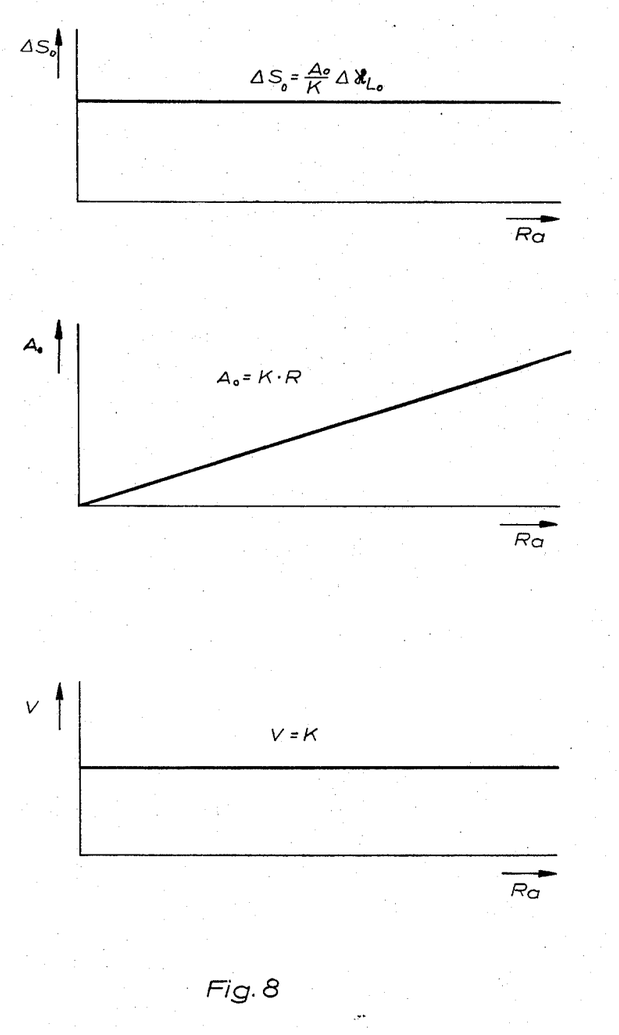
FIG. 8 are diagrams similar to FIG. 5 for an (simplest) embodiment of the invention.
Figure 12:
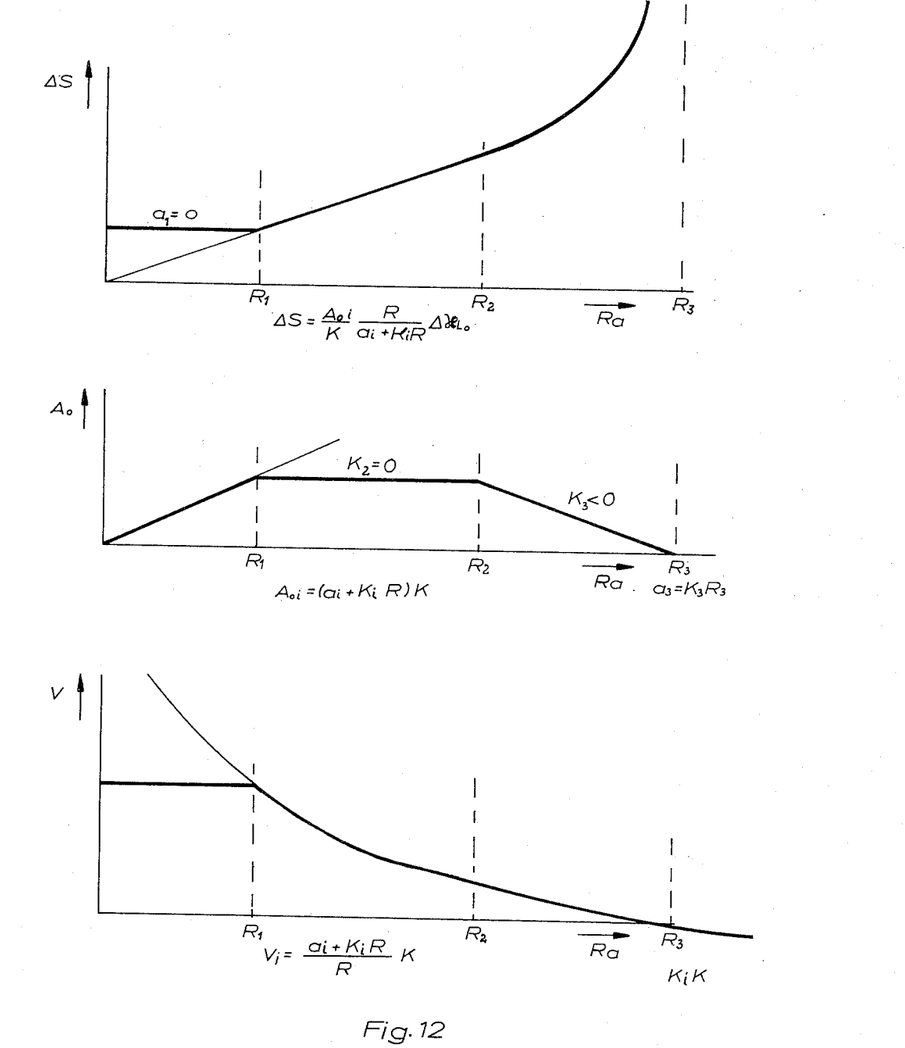
FIG. 12 illustrates diagrams similar to FIG. 11.

The functions of the slant distance which are preset in the function generators 22 and 32, depend on the desired guide performance. The FIGS. 8 and 12 show different examples, in diagrams similar to the diagrams of FIG. 5. Therein, the intermediate diagram corresponds to the function transmitted by the function generator 22 or 32 respectively. The upper diagram illustrates the shape of the "curves of same pointer deflection," i.e. of the travel deviations from the localizer and glide path beam which, for instance, causes the same maximum deflection of the pointer on the crosspointer instrument 30 again as a function of the slant distance. As compared therewith, the lower diagram illustrates the indicating sensitivity of the crosspointer instrument 30 to travel deviations from the localizer and glide path beam.

In the layout of FIG. 8, the angle deviation $\Delta H_{L_0}$ is multiplied by a function $(A_o/K)$ (K being a constant) which is directly proportional to the slant distance $R_a$, meaning that the indicating sensitivity related to the angle increases proportionally to the distance from the localizer and glide path transmitter. Because of the equation (1) the travel deviation $\Delta S_o$ from the localizer and glide path beam corresponding to the maximum instrument deflection remains constant. Also the indicating sensitivity V of the crosspointer instrument to such travel deviations remains constant. When, for instance, relating this fact to the altitude guidance of the aircraft, this signifies that the altitude deviation of the aircraft from the glide path beam is being measured. Therefore, ths human pilot is in a position to hold the aircraft on the glide path beam with a specific accuracy of altitude guidance until landing. Such a performance of the device for flight path guidance is particularly advantageous in the vicinity of the glide path transmitter. At greater distances from the glide path transmitter such a performance could be impractical, because it induces the human pilot to keep the aircraft on the commanded glide path beam with an accuracy unnecessary at greater distances. Therefore, at greater or medium distances from the beam transmitter it may be recommendable to guide the flight path in the conventional manner in dependence on the angle deviation.

Figure 9:
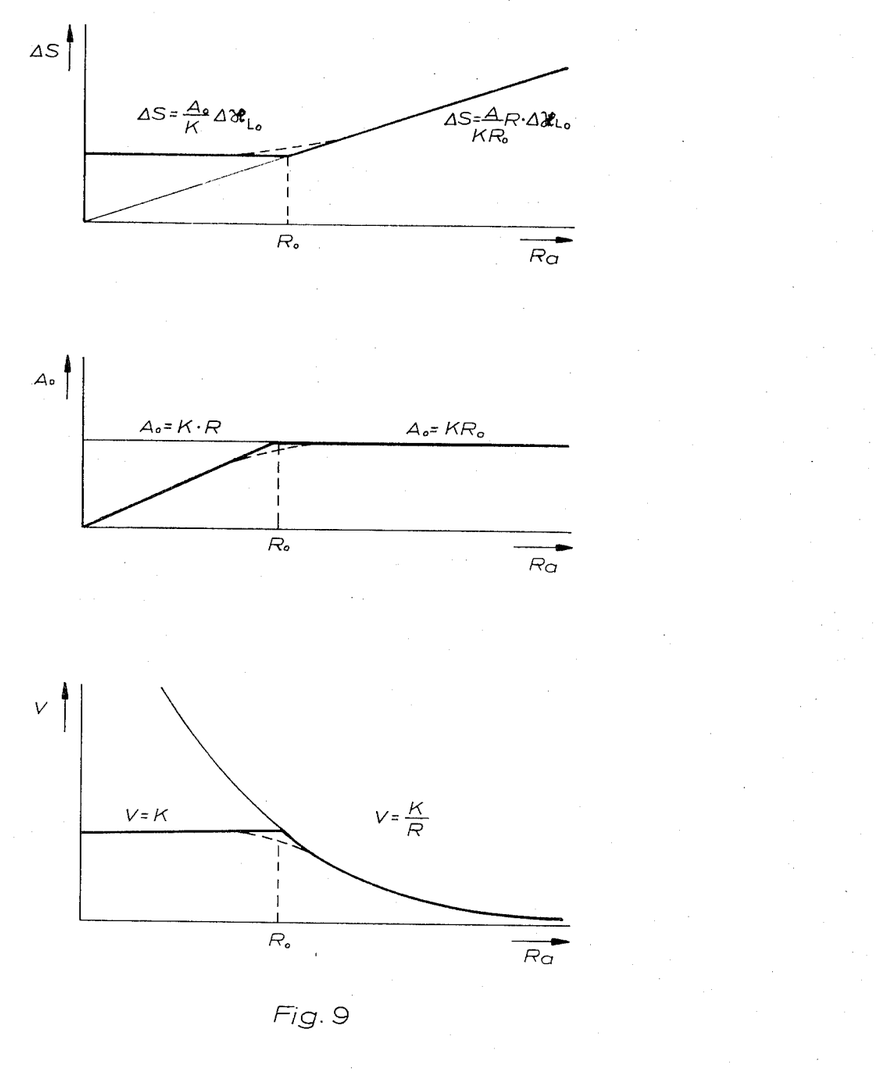
FIG. 9 illustrates diagrams similar to FIG. 5 for an embodiment of the invention in which at a small distance from the localizer and glide path transmitter the travel deviation is applied to the instrument and at a greater distance as in conventional apparatus the angle deviation is applied to the instrument.

This will be achieved if the characteristics of the device are selected in the manner of FIG. 9. For small slant distances up to a distance $R_0$ the device according to FIG. 9 shows the performance of FIG. 8, that means a constant indicating sensitivity for travel deviations from the beam, whereas for greater slant distances the characteristics assume the course of FIG. 5, that means a constant indicating sensitivity related to angle deviations are supplied by them.

Figure 10:
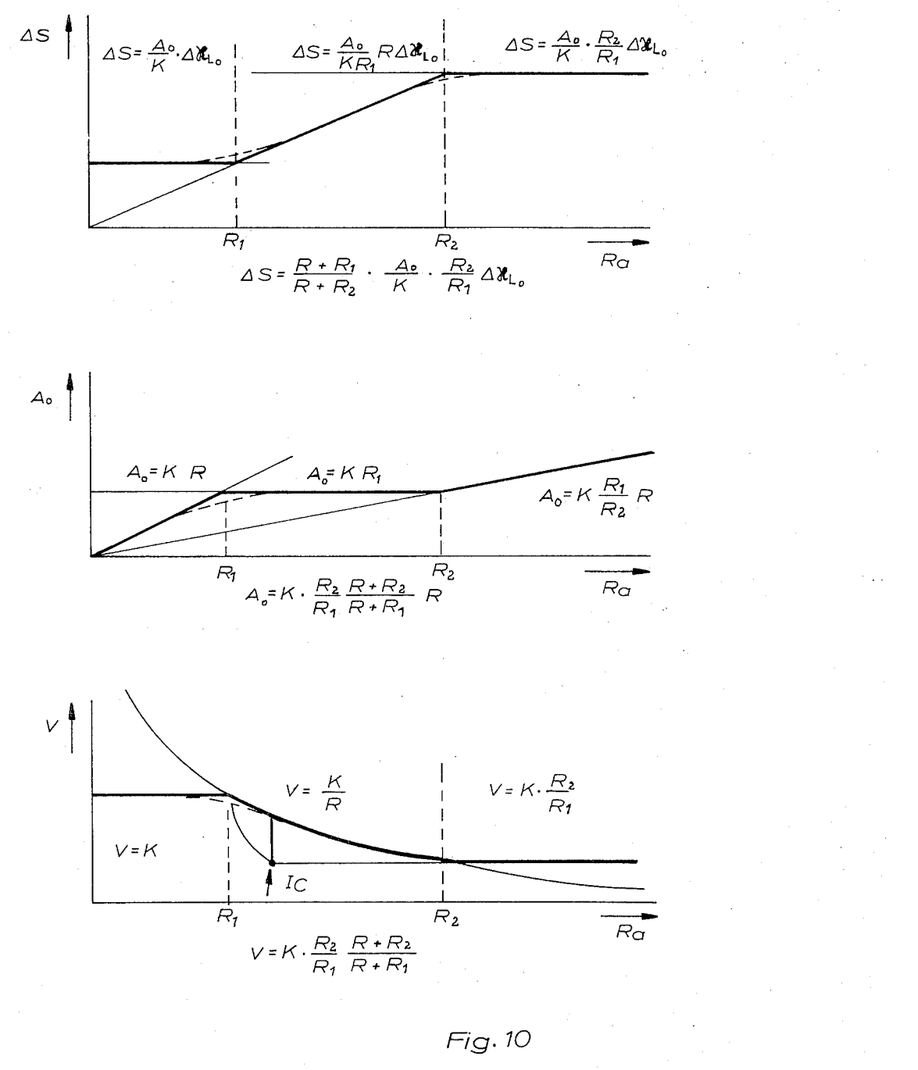
FIG. 10 illustrates diagrams similar to FIG. 5 for an embodiment of the invention which is particularly adapted for the lateral guidance of the aircraft.

FIG. 10 illustrates a setup of the device, in particular of the function generator 22, which is particularly adapted for the lateral guidance of the aircraft. This will be subsequently explained more fully. In the layout according to FIG. 10 a constant indicating sensitivity as related to travel deviations from the localizer beam is obtained in a close range (up to $R_1$). In a medium distance range ($R_1$ to $R_2$) a performance according to FIG. 5 is obtained, that means a constant indicating sensitivity related to the angle deviation, whereas at great distances (above $R_2$) a constant sensitivity independent of the distance as related to travel deviations, albeit a substantially smaller value of sensitivity, is again obtained. The curves of constant instrument deflection, thus, the travel deviations from the beam, causing a constant deflection of the crosspointer instrument 30 in dependence on the distance R have a bottle-shaped form.

Figure 11:
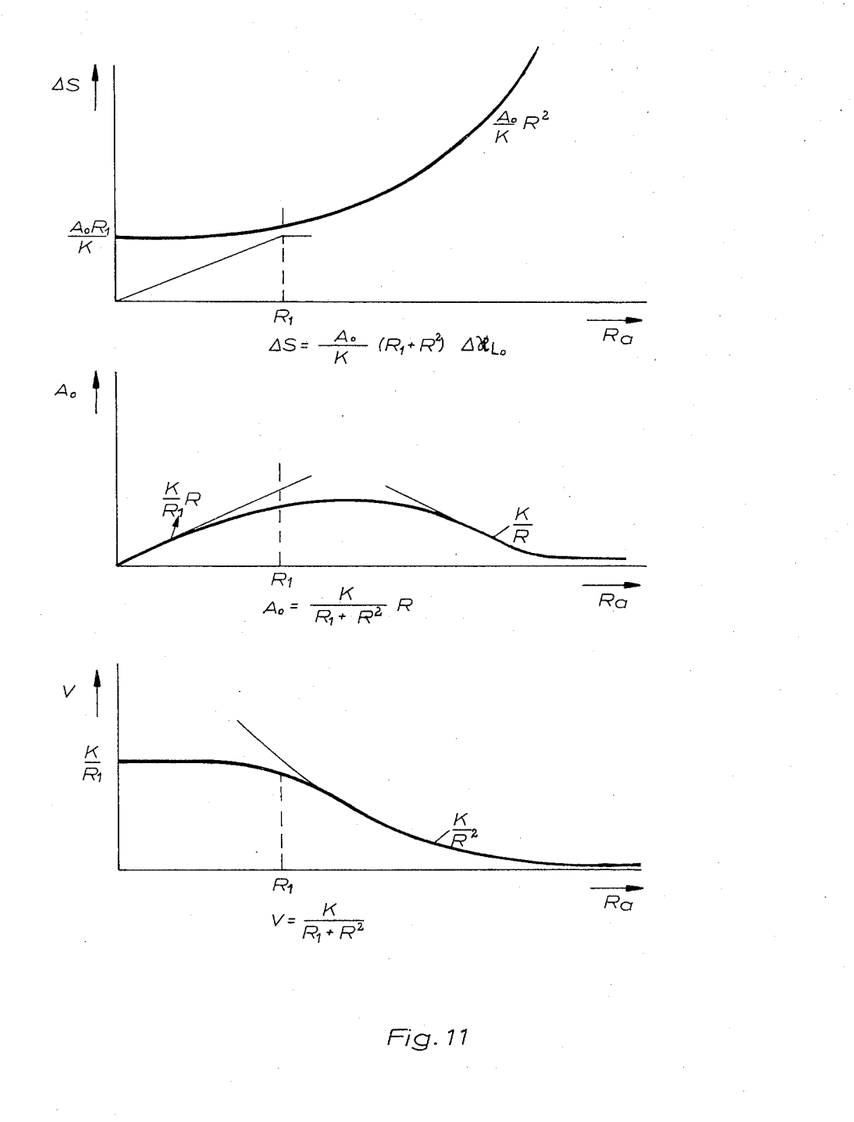
FIG. 11 illustrates diagrams similar to FIG. 5 for an embodiment of the invention which is particularly adapted for the altitude guidance of the aircraft.

Particularly for better horizontal threading it may be desirable that the sensitivity related to travel deviations at long distances decreases overproportionally to the distance, so that at those long distances a decrease in the sensitivity related to the angle deviation is also obtained. In a medium range it is possible to fly at a constant sensitivity related to the angle deviation, while at small distances a constant sensitivity to travel deviations is again employed. Then, the curves of same instrument deflection have a trumpet-shaped form, as is obvious from FIGS. 11 and 12. The FIGS. 11 and 12 reveal two possibilities of achieving such a performance, wherein in the one case the function transmitted by the function generator 32 is a steady function of the distance R, while in the other case this function is composed of straight-line sections.

Figure 13:
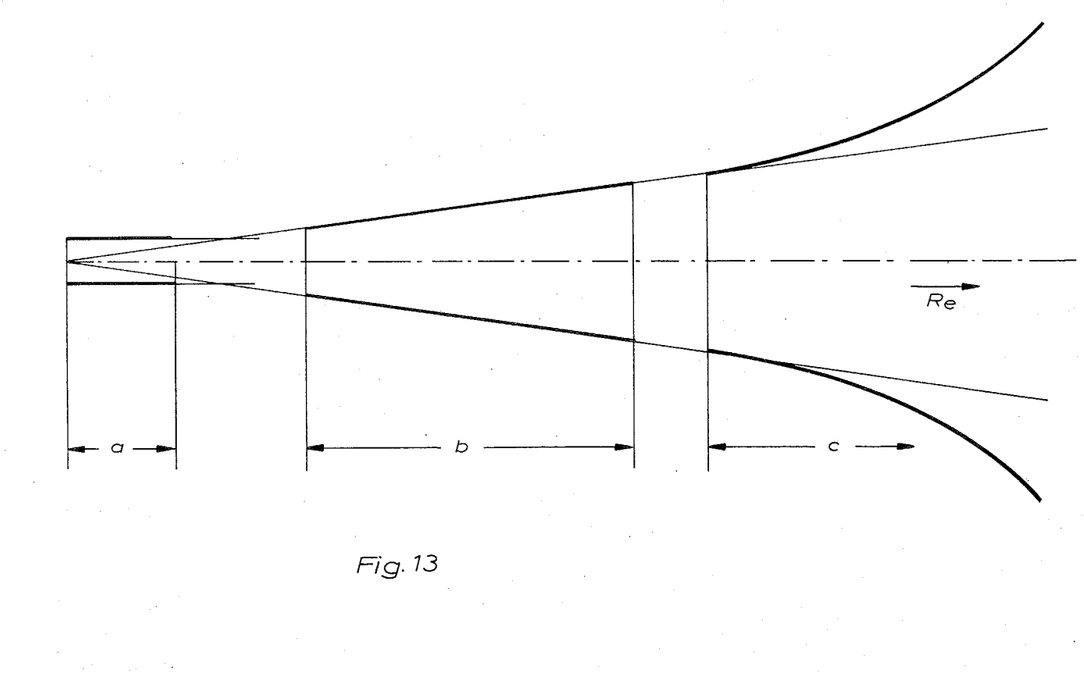
FIG. 13 illustrates lines of constant crosspointer deflection for the altitude guidance of the aircraft in an embodiment of the invention having characteristics approximately according to FIG. 11.

FIG. 13 by way of example illustrates lines of constant crosspointer deflection of such a trumpet-shaped nature. Such an arrangement is expediently used for altitude guidance in order to facilitate "threading" of the aircraft into the slide path beam. In a range, a, close to the airport the sensitivity to altitude deviations is constant. Farther out in a range b, the altitude deviations corresponding to a constant given crosspointer deflection increase proportionally to the distance, while in a range of long distances (c) the altitude deviations corresponding to a constant crosspointer deflection increase overproportionally to the distance.

Such "trumpet-shaped" lines of same crosspointer deflection are perhaps less well suited for lateral guidance. For lateral guidance a method is required indicating to the human pilot when standard turns at $\omega_s = 180°/min$ must be initiated in order to find the commanded localizer beam without drastic measures of correction and to hold it. When flying standard turns, each flight-path speed U has associated therewith a corresponding radius of turn.
$R_s = (U/\omega_s)$ or at $\omega_s = 180°/min$ $$R_s \text{ (m)} = 60/\pi.U$$

where $U$ is to be stated in m/sec. With a setup of the device for path guidance according to FIG. 10, leading to "bottle-shaped" lines of constant crosspointer deflection entry into the localizer beam can be effected in the following manner.

In the range of entry of flight a constant indicating sensitivity is adjusted which according to FIG. 8 leads to an indication proportional to the lateral deviation. If the indication is adjusted in such a manner that an important mark of the crosspointer instrument 30, for instance the three-thirds mark (see FIG. 15), corresponds to the standard radius $R_s$, then during an approach vertical to the runway the human pilot can initiate the standard turn, when the pointer reaches the three-thirds mark. He can do this independently of the exact distance from the localizer beam transmitter at which the aircraft meets the localizer beam. After 30 seconds the commanded localizer beam is reached and the turn is terminated. The following relation exists between direction of approach $\psi$ and the instrument indicating mark $A_m$ at which the standard turn is initiated.

$$A_m = (1 - \cos \psi) (K) (R_s) \quad (5)$$

If $\Delta t$ is the time after which this standard turn must be again terminated, then the following connection between direction of approach $\psi$, instrument indicating mark $A_m$ and time $\Delta t$, for which the standard turn must be flown, is obtained:

|      | $A_m$      | $t$    |
|------|------------|--------|
| 90°  | 1.000 $KR_s$ | 30.0 s |
| 60°  | 0.500 $KR_s$ | 20.0 s |
| 45°  | 0.293 $KR_s$ | 15.0 s |
| 30°  | 0.135 $KR_s$ | 10.0 s |

For example, with an approach at 45° to the direction of the runway, the standard turn must be initiated when reaching the one-third mark and must be terminated again after 15 seconds.

Figures 14, 15, 16:
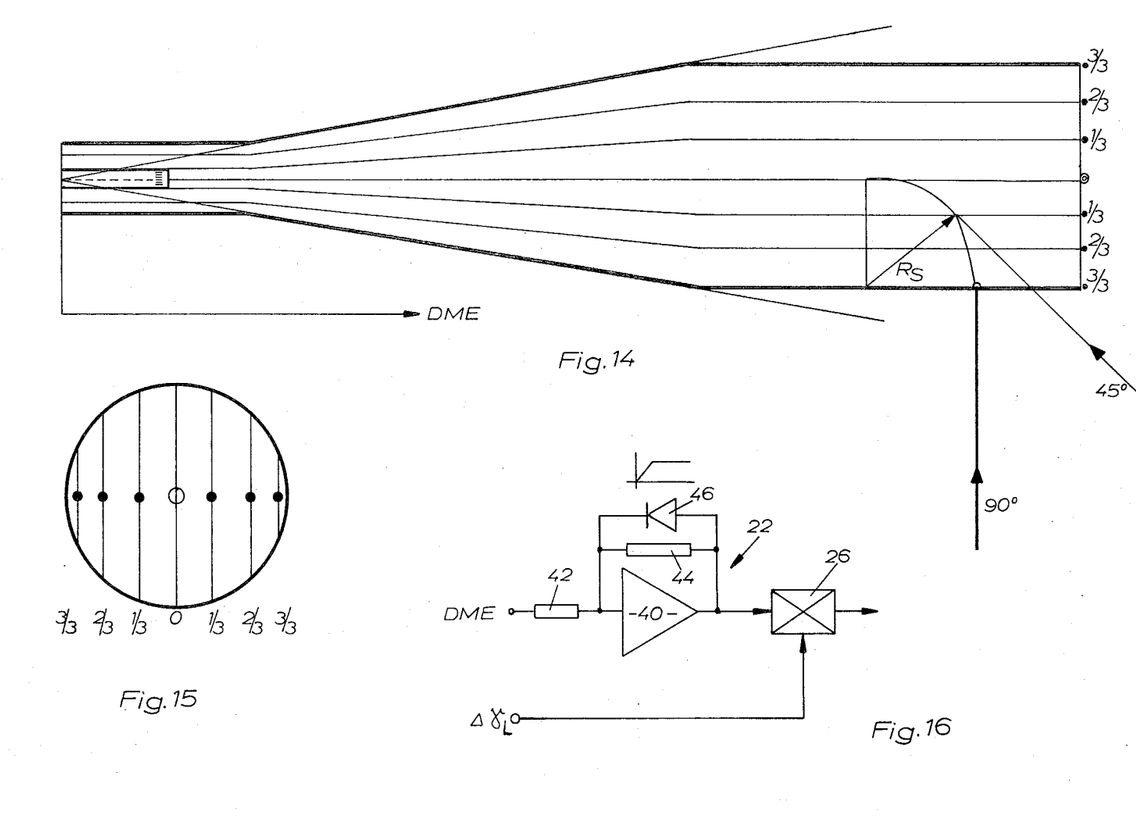
FIG. 14 illustrates lines of constant crosspointer deflection for the lateral guidance of the aircraft in an embodiment of the invention having characteristics approximately according to FIG. 10.
FIG. 15 illustrates a front view of a respective pointer instrument thereof.
FIG. 16 illustrates a feasible circuit arrangement for generating a performance according to FIG. 9.

FIG. 16 illustrates a specific example of a function generator, in this instance a function generator 22 for obtaining a performance in accordance with FIG. 9. Here the generator is a very simple device to limit the DME-signal from the localizer and glide path receiver. The function generator 22 comprises an operational amplifier 40 to which is applied the DME-signal in form of a d.c. voltage via a resistor 42. A negative feedback loop from the output to the input of the amplifier includes a resistor 44 and a diode 46 in parallel. The diode 46 has a threshold value (that means it starts conducting) only above a predetermined applied voltage. For small DME-values the diode 46 is non-conducting. The function generator 22 transmits the DME-signal proportionally to an amplification factor given by the resistors 44 and 42. When the limit value is reached at which the diode 46 becomes conducting, the negative feedback will be so increased through the diode that thereafter the output voltage of the amplifier is constant. The output signal thus obtained (FIG. 9) is multiplied by the elevation angle deviation by means of the multiplying element 26.

We claim:

1. In an apparatus for directing the flight path of an aircraft to an airport having transmitter means sending a localizer and glide path beam, said apparatus including receiver means on the aircraft for supplying input signals indicative of the aircraft position with respect to said beam, computer means connected to the receiver means for producing deviation signals representing the deviation between the aircraft position as represented by said input signals and a predetermined approach profile, and a device connected to said computer means for use in directing the flight of the aircraft in accordance with said deviation signals, the improvement comprising:

said computer means including means for multiplying said deviation signals by a function of the slant distance before the deviation signals go to said device, whereby the sensitivity of the device to said deviation signals in controlled in accordance with said function of the slant distance.

2. In an apparatus for directing the flight path of an aircraft to an airport having transmitter means sending a localizer and glide path beam, said apparatus including:

receiver means on the aircraft for supplying signals indicative of the aircraft position with respect to said beam, said receiver means supplying a slant distance signal, an azimuth angle deviation signal and an elevation angle deviation signal, for use where said transmitter means issues azimuth and slant distance signals from a first location at the airport and from a second location a predetermined distance from the first location issues elevation signals, a device connected to said receiver means for use in directing the flight of the aircraft in accordance with said signals, and means for supplying a signal indicative of said predetermined distance, the improvement comprising:

computer means connected to said receiver means and said device for multiplying the deviation signals from a predetermined approach profile by a function of the slant distance before the signals go to said device, said computer means including:

a first function generator having an input and an output, the slant distance signal being applied to the input, first multiplying means having two inputs and an output means connecting the output of the function generator with one of said two inputs, the azimuth angle deviation signal being applied to the second of said two inputs, a second function generator having an input and an output, means connected to said input of the second function generator to the difference of said slant distance and said predetermined distance thereto, second multiplying means having two inputs and an output with one of its inputs being connected to the output of the second function generator, an elevation angle-deviation signal being applied to the second input of the second multiplying means, and means connecting the outputs of the multiplying means to said device.

3. In an apparatus as set forth in claim 2, wherein the first function generator transmits the slant distance signal according to a function showing a proportional rise in a range of small slant distances, a constant value in a range of medium slant distances and another proportional rise in a range of great slant distances.

4. In an apparatus as set forth in claim 3, wherein the second function generator means transmits the difference signal according to a function showing a linear rise in a range of small difference signals, a constant value in a range of medium difference signals and a drop in a range of great difference signals.

5. In an apparatus as set forth in claim 2, wherein the first function generator transmits the slant distance signal according to a function showing a proportional rise in a range of small slant distances and a constant value above a preset limit value, said first function generator being a limiter and including an operational amplifier and negative feedback means across said amplifier and comprising a diode and a resistor connected in parallel.

* * * * *